(12) United States Patent
Nygreen et al.

(10) Patent No.: US 7,911,952 B1
(45) Date of Patent: Mar. 22, 2011

(54) INTERFACE WITH CREDIT-BASED FLOW CONTROL AND SUSTAINED BUS SIGNALS

(75) Inventors: Flemming Nygreen, Copenhagen East (DK); Morten Stribaek, Frederiksberg (DK); Ole Kristian Friis, Hvidovre (DK); Kim Mostrup, Frederiksberg (DK)

(73) Assignee: MIPS Technologies, Inc., Sunnyvale, CA (US)

( * ) Notice: Subject to any disclaimer, the term of this patent is extended or adjusted under 35 U.S.C. 154(b) by 1613 days.

(21) Appl. No.: 10/193,682

(22) Filed: Jul. 12, 2002

(51) Int. Cl.
  *H04J 3/14* (2006.01)
  *H04J 3/04* (2006.01)
(52) U.S. Cl. ........................ 370/235; 370/249
(58) Field of Classification Search .................. None
  See application file for complete search history.

(56) References Cited

U.S. PATENT DOCUMENTS

| | | | | |
|---|---|---|---|---|
| 5,218,690 A * | 6/1993 | Boioli et al. | | 710/315 |
| 5,253,347 A * | 10/1993 | Bagnoli et al. | | 710/113 |
| 5,453,982 A * | 9/1995 | Pennington et al. | | 370/235 |
| 6,044,406 A * | 3/2000 | Barkey et al. | | 709/235 |
| 6,681,283 B1 * | 1/2004 | Thekkath et al. | | 710/305 |
| 6,760,793 B2 * | 7/2004 | Kelley et al. | | 710/52 |
| 6,832,279 B1 * | 12/2004 | Potter et al. | | 710/112 |
| 6,938,128 B1 * | 8/2005 | Kuskin et al. | | 711/141 |
| 7,103,672 B1 * | 9/2006 | Sharma | | 709/232 |
| 7,165,094 B2 * | 1/2007 | Weber et al. | | 709/207 |
| 2002/0166074 A1 * | 11/2002 | Cheung et al. | | 713/300 |
| 2003/0115105 A1 * | 6/2003 | Lin et al. | | 705/26 |
| 2003/0133463 A1 * | 7/2003 | Lacey, III | | 370/411 |
| 2004/0174814 A1 * | 9/2004 | Futral | | 370/231 |

* cited by examiner

*Primary Examiner* — Ricky Ngo
*Assistant Examiner* — Clemence Han
(74) *Attorney, Agent, or Firm* — Sterne, Kessler, Goldstein & Fox P.L.L.C.

(57) ABSTRACT

An interface between electronic devices uses a credit-based flow protocol with sustained bus signals. An initiating device waits for credit to issue a command to a target device. When credit is available, the initiating device issues the command to the target device such that the command is accessible by the target device until a new command is issued. The command may include a read or write request to the target device.

29 Claims, 6 Drawing Sheets

INTERFACE WITH CREDIT-BASED FLOW CONTROL AND SUSTAINED BUS SIGNALS

TECHNICAL FIELD

This description is directed to an interface between various pieces of electronics and more particularly to an interface using credit-based flow control and sustained bus signals.

BACKGROUND

When two electronic components communicate, an initiating device sends a signal to a target device according to a communication protocol. The signal may include commands, data, or other information. If the target device is unable to handle the signal sent by the initiating device, the communication may not be properly handled unless the communication protocol includes some recovery or flow control mechanism.

A flow control mechanism provides a method of adjusting the flow of signals from an initiating device to a target device to ensure that the target device can handle all of the incoming signals. If the initiating device is capable of sending signals to the target device at a rate faster than the ability of the target device to handle or process them, a flow control mechanism may become increasingly useful.

One flow control mechanism that may be used in data communication is an xon/xoff protocol. With this mechanism, the target device receives and processes signals received from the initiating device until the target device is no longer able to handle additional signals. The target device then sends a xoff signal to the initiator to indicate that it is not able to handle additional signals. When the target device is again able to accept additional signals, the target sends an xon signal to the initiator to indicate that communication may resume. This flow control mechanism allows the target device to control the flow of communication from the initiating device.

Another flow control mechanism is a ready/acknowledge scheme. In this scheme, the initiator asserts a ready signal to indicate that it is ready to transfer a request. The target asserts an acknowledge signal when it is ready. The transfer takes place when both ready and acknowledge signals are asserted. This allows communication to be delayed until the target is ready to accept a signal from the initiator.

Another flow control mechanism uses a credit-based scheme in which the target issues credits to the initiator. For example, if the target device issues four credits, then the initiating device is allowed to send four requests whenever such requests are needed. The target device can issue a credit to the initiator by asserting a credit signal. When the initiating device is ready to issue a signal to the target, the initiating device asserts a valid signal to indicate that communication is available.

A credit-based flow control mechanism may allow pipeline registers to be inserted on the credit and valid signals without changing the mechanism because there is no fixed relationship between those signals. The initiating device can assert valid signals as long as it has credits available. Inserting pipeline registers between an initiating device and a target device isolates combinatorial logic behind the registers so as to provide a clean timing interface.

SUMMARY

In a general aspect, providing an interface from an initiating device, such as a system controller, to a target device using credit-based flow control includes waiting until a command is available to be issued to a target device; when a command is available, waiting until the target device has issued credit to the initiating device; and, when credit is available, issuing the command to the target device. The command is accessible by the target device until a new command is available.

The command may include a read or write request to the target device. Because the command is sustained until a new command is available, the target device may be implemented without buffers. In addition, the command may be a burst command indicating a number of consecutive commands to be executed, such as, for example, 1, 2, 4, or 8 consecutive commands.

In another general aspect, an initiating device with an interface to a target device using a credit-based flow control includes a credit register, a communication bus, a command credit signal input to receive a signal from the target device indicating that the initiating device may issue a transaction across the communication bus, and a command new signal output to send a command new signal to the target device indicating that a new transaction is being issued on the communication bus. The communication bus is coupled to the target device such that the initiating device can issue transactions to the target device. A transactions is sustained on the communication bus until a new transaction is issued.

In another general aspect, a symmetrical interface between a first device and a second device uses a credit-based flow control scheme. The interface includes a first bus operable to couple a first device to a second device, a first credit signal corresponding to the first bus, a first command signal corresponding to the first bus, a second bus operable to couple the first device to the second device, a second credit signal corresponding to the second bus, and a second command signal corresponding to the second bus. A transaction issued on the first bus is sustained on the first bus until a new transaction is issued on the first bus. The first credit signal may be asserted to indicate that a transaction may be issued on the first bus and the second credit signal may be asserted to indicate that a transaction may be issued on the second bus. The first command signal may be asserted to indicate that a transaction is being issued on the first bus and the second command signal may be asserted to indicate that a transaction is being issued on the second bus.

The described credit-based flow control mechanism reduces the buffer requirements of target devices by keeping communicated signals registered until the next signal is sent by the initiating device to the target device.

The details of one or more implementations are set forth in the accompanying drawings and the description below. Other features will be apparent from the description and drawings, and from the claims.

DETAILED DESCRIPTION

Figure 1:
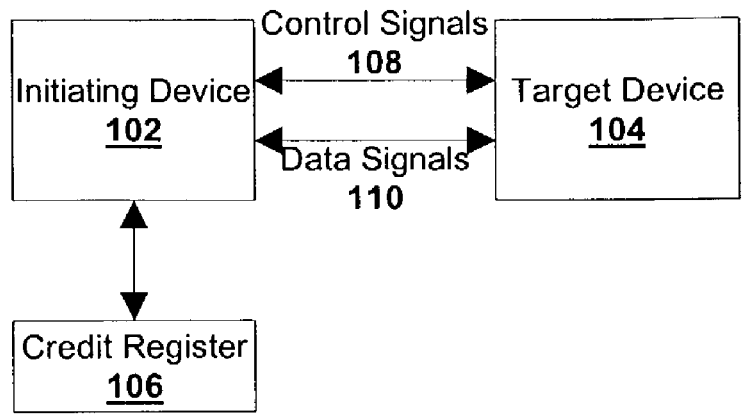
FIG. 1 is a block diagram of two devices using a credit-based flow control scheme with sustained bus signals.

Referring to FIG. 1, a credit-based flow control scheme allows an initiating device 102 to communicate to a target device 104. An implementation of this flow control scheme is discussed in the "MIPS SDC-It™ System Controller Integrator's Guide v1.00" (Jun. 28, 2002) available at http://www.mips.com/publications/MIPSSOC.html which is hereby incorporated by reference in its entirety for all purposes. The target device 104 controls the flow of communication from the initiating device 102 to the target device 104 by issuing credits that are stored by the initiating device 102 in a credit register 106. The initiating device 102 may only send data to the target device 104 when credits are available. For example, a target device 104 may include a number of buffers to store communications from an initiating device 102 for processing. The target device 104 may issue a credit for each empty buffer to the initiating device 102 to indicate that the target device 104 is ready to receive and process communications.

The initiating device 102 and the target device 104 use control signals 108 and data signals 110 to communicate. Initiating device 102 and target device 104 may be implemented using any circuit or circuit component. The target device 104 may include circuit components such as, but not limited to, an mpeg decoder, an encryption module, a peripheral bus controller, an AHB interface, and a PCI interface.

The control signals 108 include various signals used to implement the communication protocol, such as a signal asserted by the target device 104 to give the initiating device 102 a credit, and a signal asserted by the initiating device 102 to indicate that a command or other data is ready for processing by the target device 104. The data signals 110 carry commands, results, or other data between the initiating device 102 and the target device 104.

It may be useful to decrease the number of buffers used by a system. For example, it may be useful to provide a target device 104 with few or no buffers. If communications between the initiating device 102 and the target device 104 are sustained until the next communication is ready, the target device 104 may reduce the number of buffers used. If the target device 104 includes a single buffer and the buffer is full, then the target device 104 still may issue a credit to the initiating device 102. If the initiating device 102 uses the credit to issue a communication to the target device 104, and the target device 104 does not have any available buffers to store the communication, the target device 104 would ordinarily be unable to handle the communication. However, by sustaining the communication sent using data signals 110, the target device 104 can process the communication without a buffer. Once the sustained communication has been processed or a buffer becomes available, an additional credit may be issued to the initiating device 102.

Data signals 110 may be sustained by holding the signals in a register until the next communication is ready. This reduces the number of buffers that may be needed by the target device 104 without significantly affecting the performance of the communication protocol.

Figure 2:
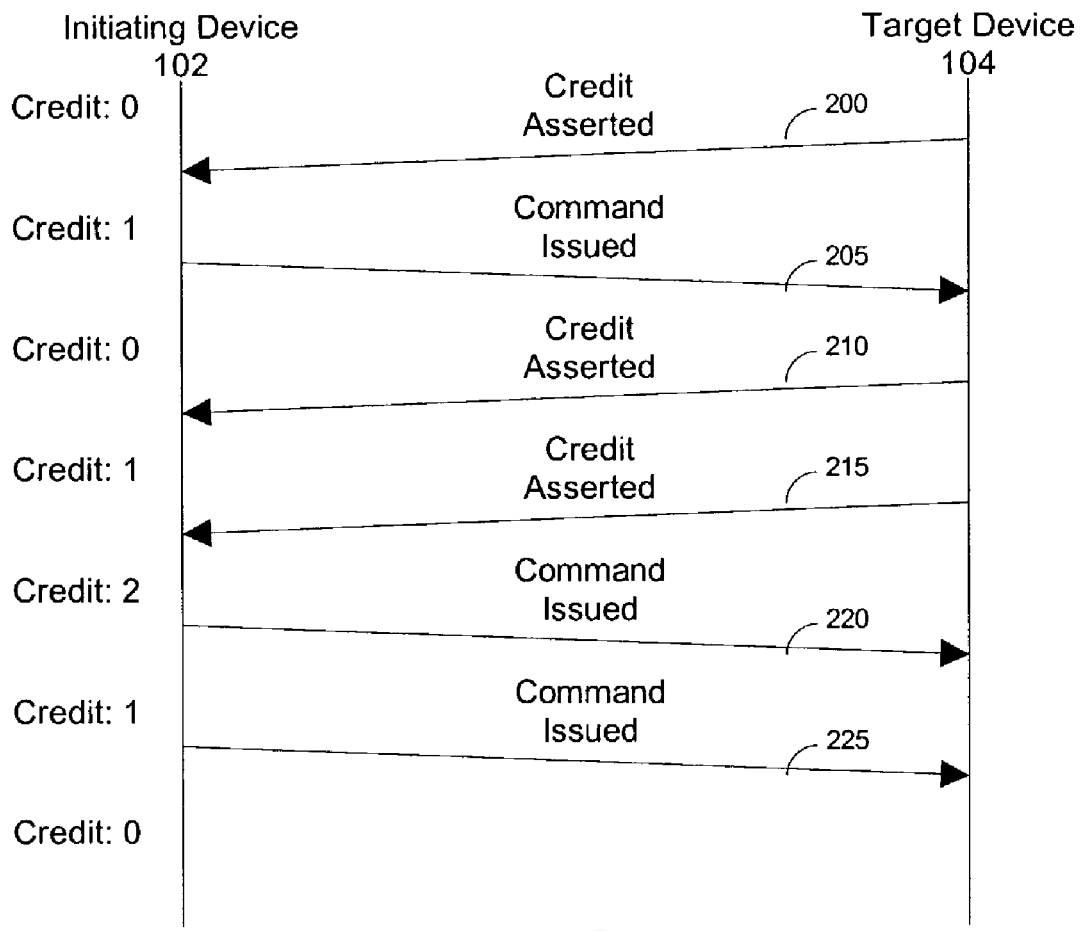
FIG. 2 is a diagram of the interactions between two devices communicating using a credit-based flow control scheme with sustained bus signals.

FIG. 2 describes an exemplary flow of control and data signals between the initiating device 102 and the target device 104. When the target device 104 is ready to begin receiving and processing communication, the target device 104 issues a credit 200 to the initiating device 102. As shown in FIG. 2, the credit signal increases the available credits, stored in credit register 106, from 0 to 1. When the initiating device later issues a command 205, the number of available credits is reduced to 0. As resources are freed, target device 104 issues two credits 210 and 215 to the initiating device 102. These credits then are used by the initiating device 102 to issue two commands 220 and 225 to the target device 104.

In the example interaction shown in FIG. 2, the target device 104 needs only one buffer when sustained bus signals are used because the target device 104 is able to use the data signals 110 in place of a buffer. If the number of credits available is kept to at most one, then no buffers are needed in the target device 104. When the initiating device 102 is out of credits, the data signals 110 do not change until the target device 104 issues an additional credit to the initiating device 102. Thus, the data signals 110 may be used as a buffer so long as the initiating device 102 does not issue additional communication until the target device 104 issues additional credit.

In this credit-based flow control scheme, the control signals 108 and the data signals 110 may each be registered at the initiating device 102 and/or the target device 104, thus isolating any combinational logic and providing a clean timing interface.

A credit-based flow control scheme with sustained bus control signals may be used in a wide variety of communication systems. For example, a system controller associated with a processor core may use the flow control scheme to communicate with custom modules or devices. FIGS. 3-6 describe an implementation of an interface to custom circuits, modules, and/or devices, called intellectual property (IP) modules. This interface is referred to below as the IP interface (IPIF). IP modules refer to soft (e.g., RTL) or hard (e.g., GDSII) embodiments of electronic circuits (e.g., circuits contained in a system on a chip, in discrete semiconductor devices, etc.). These modules may be transformed into actual hardware using conventional semiconductor design and fabrication techniques well known to those having ordinary skill in the art.

Additionally, the credit-based flow control scheme may be configured to allow bursts of communications. For example, if the initiating device 102 has, for example, four credits, it may issue a burst of four consecutive communication transactions.

Figure 3:
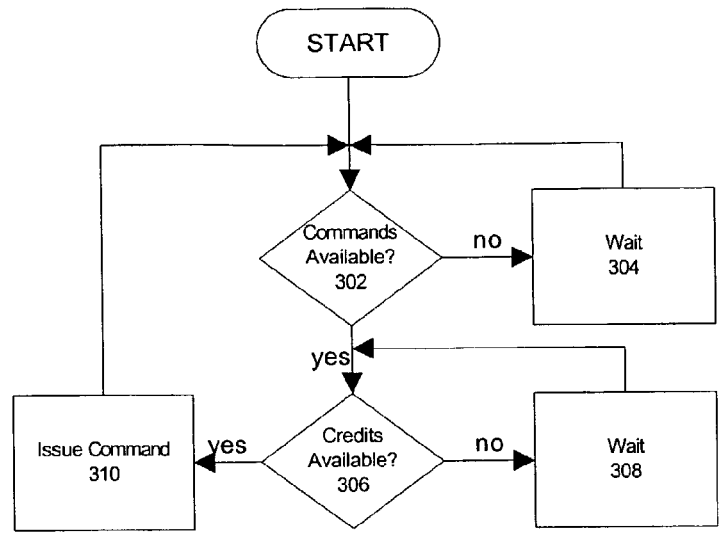
FIG. 3 is a flow chart of a method for providing an interface to an electronic device using a credit-based flow control scheme.

Referring to FIG. 3, an initiating device 102 may provide a credit-based flow control interface by first determining if any commands are available (step 302). If no commands are available, the initiating device 102 waits (step 304) and again determines if any commands are available (step 302). This process continues until a command is available for issue.

The initiating device 102 then determines whether credits are available to issue the next command (step 306). If no credit is available, the initiating device 102 waits (step 308) and again determines if any credits are available (step 306).

If credits are available, the initiating device 102 issues the command to a target device 104 (step 310) and begins the process again at step 302.

Figure 4:
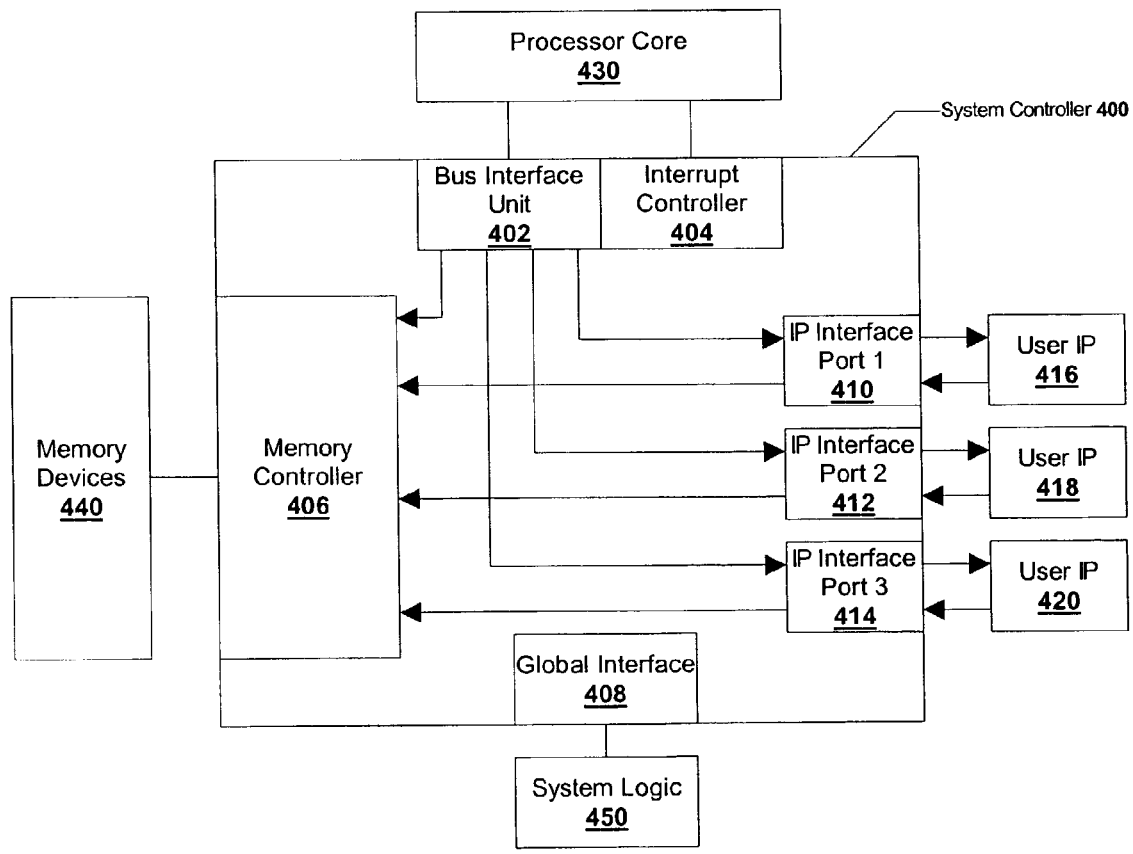
FIG. 4 is a block diagram of a system controller using a credit-based flow control scheme to communicate with various electronic devices.

Referring to FIG. 4, a system controller 400 provides an interface between a processor core, memory devices, and other components. The system controller 400 communicates with the processor core 430 through a bus interface unit (BIU) 402 and an interrupt controller 404 with memory devices 440 through a memory controller 406, and with other components (such as system logic 450, and user IP modules 416, 418, and 420) through a global interface 408 and one or more IP interface ports 410, 412, and 414. System logic 450 can provide, for example, administrative signals to controller 400 such as clock, reset, scan, boot options, etc. The communication protocol between the IP interface ports 410, 412, and 414 and user IP modules 416, 418, and 420 uses a credit-based flow control with sustained bus signals with the IP interface ports 410, 412, and 414 serving as initiating devices 102 and the user IP modules 416, 418, and 420 serving as target devices 104. As one example, the IP interface port 410 would include the initiating device 102 and the credit register 106 of FIG. 1 while the user IP module 416 would include the target device 104. This arrangement is shown in FIG. 5A.

Figure 5A:
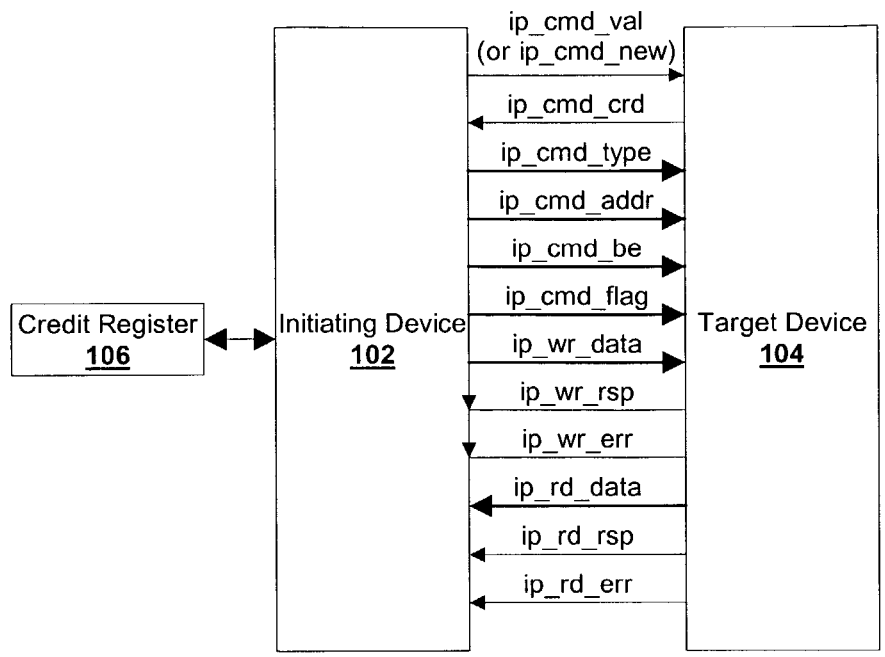
FIG. 5A is a block diagram showing the control signals and data signals between an initiating device and a target device in an implementation of a credit-based flow control protocol.

Referring to FIG. 5A, the control signals 108 and the data signals 110 between the initiating device 102 and the target device 104 include ip_cmd_crd; ip_cmd_val or ip_cmd_new; ip_cmd_type; ip_cmd_addr; ip_cmd_be; ip_cmd_flag; ip_wr_data; ip_wr_rsp; ip_wr_err; ip_rd_data; ip_rd_rsp; and ip_rd_err.

The ip_cmd_crd signal is a command credit handshake signal asserted by the target device 104. By asserting this signal for a clock cycle, the target device 104 indicates that it is ready to accept an additional command from the initiating device 102. In this implementation, ip_cmd_crd uses a single bit. However, some implementations may use a target device 104 to issue multiple credits simultaneously. For example, three bits may be used to allow the target device 104 to specify up to seven credits. In the illustrated implementation, the ip_cmd_crd is always valid (i.e., it is always driven asserted or deasserted by the target device 104).

The ip_cmd_val signal is a command valid handshake signal asserted by the initiating device 102. For example, the initiating device 102 may assert ip_cmd_val for a clock cycle to indicate that the initiating device 102 is driving a valid command. The initiating device 102 also may assert ip_cmd_val for a clock cycle to indicate that write data for a write transfer is on the interface. In this implementation, the ip_cmd_val signal is always valid.

This signal is transmitted over an interface in a credit-based flow control scheme that does not sustain bus signals, as described below in connection with FIG. 8 (where the "inbound" signals include such a valid signal.

Alternatively, a credit-based flow control scheme that sustains bus signals may generate a "new" signal as described below in connection with FIG. 8 (where the "outbound" signals include such a new signal). Referring to FIG. 5, the ip_cmd_new device 102 begins the transfer of a command valid handshake signal asserted by the initiating device 102. When device 102 begins the transfer of a command, it asserts ip_cmd_new and drives all the other command related signals (ip_cmd_*) valid. In accordance with one embodiment, the ip_cmd_new signal is asserted for one cycle of the device clock only, regardless of how many clock cycles the transfer takes. In this embodiment, the rest of the command related signals are held valid until the start of the next command or write transfer. An advantage of this is that target device 104 can save one level of buffer registers for holding the command and, in the case of a write transfer, the write data. By giving one credit at the time, a slow target device 104 can do entirely without any buffer registers, and still use as many clock cycles as it wishes for the transfer.

The ip_cmd_type signal is a command type signal asserted by the initiating device 102. This signal defines the type of the communication on the interface. In this implementation, the ip_cmd_type signal includes four bits, with bits 2 and 3 identifying the length of the transaction measured as a number of transfers, bit 1 identifying the direction of the transfer as a read or write, and bit 0 indicating whether the transaction will access register resources in the target. Bits 2 and 3 indicate the length of the transaction as shown in Table 1.

TABLE 1

| ip_cmd_type[3:2] | Length |
| --- | --- |
| 00 | 1 or Unspecified |
| 01 | 2 |
| 10 | 4 |
| 11 | 8 |

The transaction length is used to indicate the number of successive transactions for bursts. For example, if the transaction length portion of the ip_cmd_type signal is indicated as "10," then the initiating device 102 is sending a burst of four consecutive communication transactions. The direction of the transaction is specified using ip_cmd_type[1]. For reads, the ip_cmd_type[1] is set to "0," and for writes, ip_cmd_type[1] is set to "1." Finally, ip_cmd_type[0] is set to "0" to indicate that no register resources will be accessed in the target device 104, and "1" to indicate that register resources will be accessed.

The ip_cmd_addr signal is a command address signal asserted by the initiating device 102. This signal specifies the word-aligned or doubleword-aligned starting address of a transfer.

The ip_cmd_be signal is a command byte enable signal asserted by the initiating device 102. This signal may be used to indicate which data bytes are to be active during a communication transfer. In one implementation, the ip_cmd_be signal is four bits long, with each of the four bits corresponding to a portion of the data bus. When one of the ip_cmd_be signal bits is asserted, corresponding data bus bits are made active during a communication transaction. If a bit is deasserted, the corresponding data bus bits are ignored.

The ip_cmd_flag signal is a command flag signal asserted by the initiating device 102. This signal contains indicators related to data transfers. The signal is a collection of signals (e.g., four 1-bit signals) that are allowed to change their value for every transfer. In this implementation, three bits are used; with the first indicating whether the transfer is locked, such that no arbitration should take place until after the next command with the flag deasserted is issued, the second indicating whether the command transferred is part of a burst, and the last indicating whether the next command to be transferred likely will access the same memory page as the present command. This signal is valid when ip_cmd_val is asserted.

The ip_wr_data signal is the write data signal asserted by the initiating device 102. This signal contains data for a write transfer. Typically, the ip_wr_data signal will be 32 or 64 bits wide.

The ip_wr_rsp is the write response signal asserted by the target device 104. This signal is asserted to indicate that the requested transfer is committed. Response signals are typically returned in order, after a possibly arbitrary delay. The ip_wr_rsp signal is always valid in this implementation.

The ip_wr_err signal is a write error signal asserted by the target device 104. This signal is asserted to indicate whether a write transfer was successful. The ip_wr_err signal is valid whenever ip_wr_rsp is asserted.

The ip_rd_data signal is a read data signal asserted by the target device 104. This signal contains data during a read transfer and is typically 32 or 64 bits wide. This signal is valid when ip_rd_rsp is asserted, unless there is a read error.

The ip_rd_rsp signal is a read response signal asserted by the target device 104. This signal is asserted to indicate that the target device 104 is driving requested read data onto the interface.

The ip_rd_err signal is a read error signal asserted by the target device 104. This signal is asserted to indicate whether a read error has occurred.

Figure 5B:
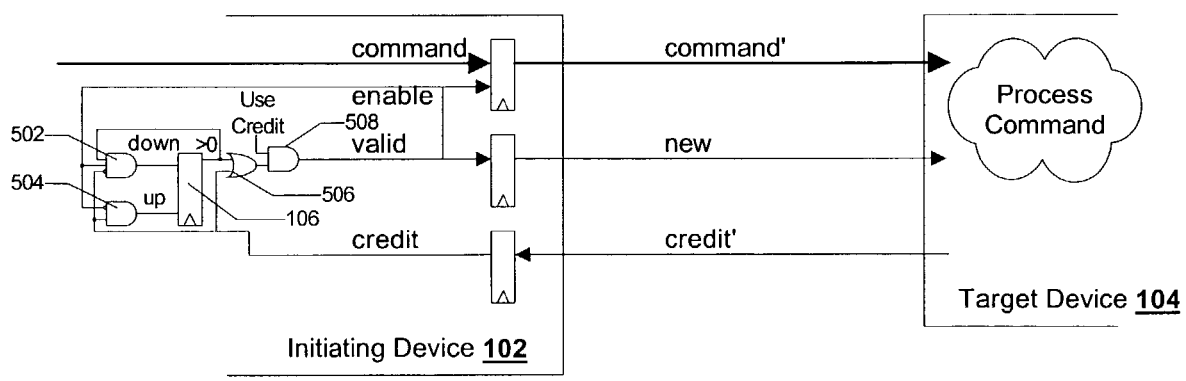
FIG. 5B is a block diagram showing circuitry that may be used to generate control signals in an initiating device.

Referring to FIG. 5B, the credit register 106 is used to determine if the target device 104 has resources available to accept and process a request from the initiating device 102. If the target device 104 asserts the ip_cmd_crd signal, indicating that target device 104 resources are available, the initiating device 102 may update the credit register 106; however, if the initiating device 102 is using a credit at the same time as ip_cmd_crd is asserted, then there the system may continue without modifying the contents of the credit register 106. FIG. 5B is a block diagram of a circuit implementing this functionality. In this implementation, the credit register 106 includes an increment signal (labeled "up") and a decrement signal (labeled "down"). When the increment signal is asserted, the value stored in credit register 106 is incremented by one. Similarly, when the decrement signal is asserted, the value stored in credit register 106 is decremented by one.

The credit register 106 should be incremented when a credit is issued by target device 104; however, if the initiating device 102 is using a credit at the same time, then the credit register 106 may be left unchanged. Logic gate 502 is used to generate a decrement signal and logic gate 504 is used to generate an increment signal for credit register 106. Logic gate 506 generates a signal indicating whether a credit is available. Finally, logic gate 508 generates a signal indicating that a credit is being used.

Logic gate 502 generates a decrement signal if there are credits stored in credit register 106, a credit is being used (as indicated by the valid signal generated by logic gate 508), and the target device 104 is not issuing a new credit. Logic gate 504 generates an increment signal if a credit is being issued by target device 104 and a credit is not being used (as indicated by the valid signal generated by logic gate 508).

Logic gate 506 indicates whether a credit is available, either from credit register 106 or from a new credit issued by target device 104. Finally, logic gate 508 generates a valid signal if credit is available and a use credit signal is asserted.

Figure 6:
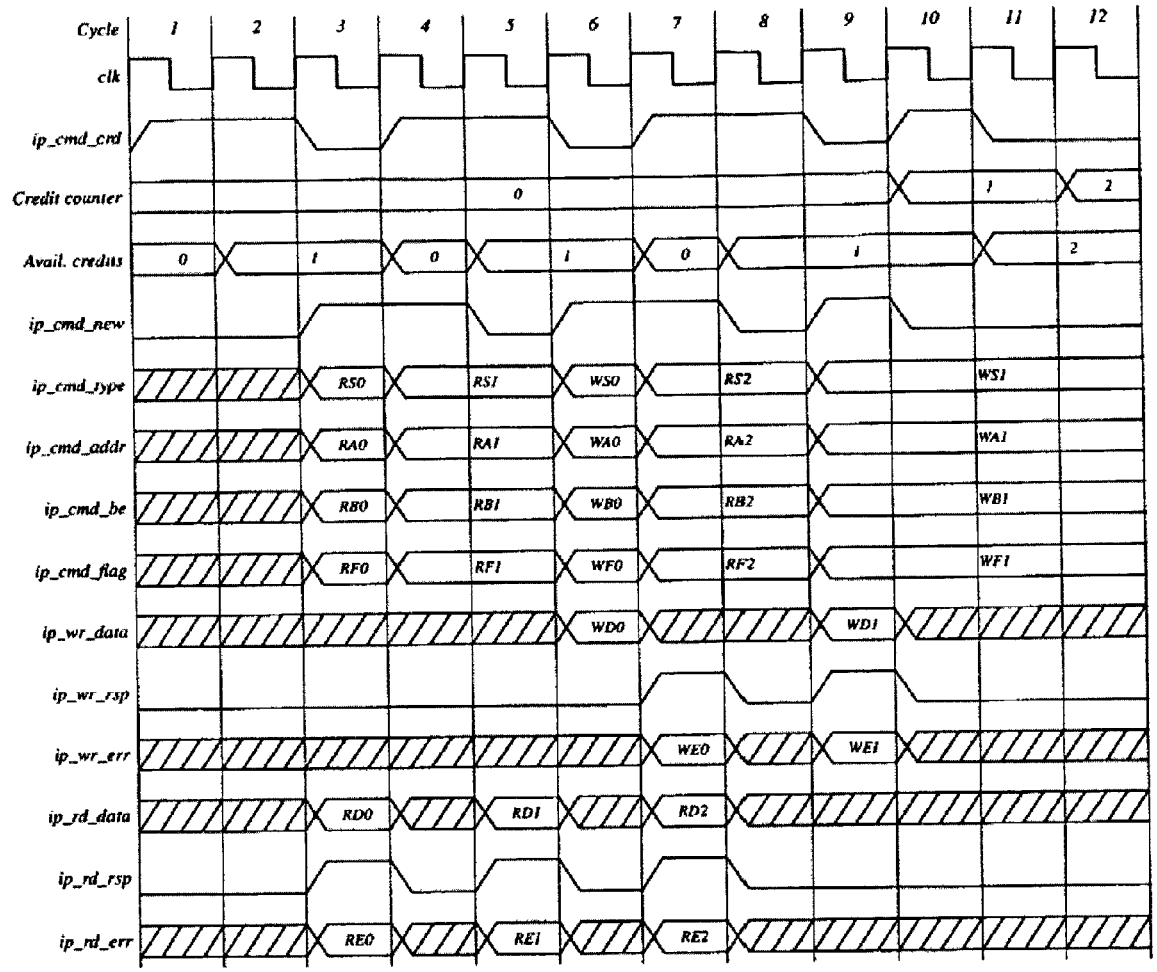
FIG. 6 is a timing diagram of the signals shown in FIG. 4 when issuing single communication transactions.

FIG. 6 describes the values of the various signals described above with respect to FIGS. 5A and 5B when performing a credit-based flow control scheme. During the first clock cycle, the credit register is zero and the target device 104 is asserting the ip_cmd_crd signal to issue a credit to the initiating device 102. No read or write transfer occurs during the first clock cycle.

In the second cycle, the number of available credits is incremented because ip_cmd_crd was asserted on the previous clock cycle and no credits were used by the initiating device 102. The target device 104 again asserts ip_cmd_crd so that the initiating device 102 may issue an additional instruction. Again, no read or write transfer occurs during this clock cycle.

In the third clock cycle, the available credits would have been updated. However, the ip_cmd_new signal is asserted using a credit, so the number of available credits is kept at one. In addition to asserting ip_cmd_new, the initiating device 102 also identifies the type, address, enabled bits, and flags using the following signals and associated values: ip_cmd_type is asserted as RS0; ip_cmd_addr is asserted as RA0; ip_cmd_be is asserted as RB0; and ip_cmd_flag is asserted as RF0. In this case, the target device 104 is able to immediately respond to the read request, placing the requested value RD0 on the data bus ip_rd_data, asserting error signal ip_rd_err as RE0, and asserting ip_rd_rsp to indicate that a response is available.

In the fourth clock cycle, the ip_cmd_new signal remains asserted to indicate that a new command is available. This command is specified using the following signals and values: ip_cmd_type as RS1; ip_cmd_addr as RA1; ip_cmd_be as RB1; and ip_cmd_flag as RF1. In addition, the target device 104 issues a new credit by asserting ip_cmd_crd after completing the first read request. In this case, the target device 104 is unable to respond to the read request in the same clock cycle. Instead of being forced to store the instruction in a buffer, the instruction may be left until a new instruction is issued. Because the initiating device 102 had no credits for the fourth clock cycle, the target device 104 can safely wait because the values are sustained until the next clock cycle.

In the fifth clock cycle, the ip_cmd_type, ip_cmd_addr, ip_cmd_be, and ip_cmd_flag signals remain asserted. This time, the target device 104 responds, asserting ip_rd_rsp and ip_rd_err as RE1 while writing the data RD1 to ip_rd_data. The number of available credits also is incremented because ip_cmd_crd was asserted during the fourth clock cycle and no additional instructions were issued by the initiating device 102.

In the sixth clock cycle, the initiating device 102 has one available credit and issues a new command using the credit so that the credit register 106 does not need to be incremented. In this clock cycle, the initiating device 102 issues a write transaction by asserting ip_cmd_type as WS0, ip_cmd_addr as WA0, ip_cmd_be as WB0, and ip_cmd_flag as WF0. This instructs the target device 104 to process the data WD0 from ip_wr_data. Because a new command is issued, the previous command signals are overwritten.

In the seventh clock, a new read transaction is issued and the previous write transaction is confirmed. The read transaction is sustained until the ninth clock cycle, when a new write transaction is issued. The write transaction is then sustained through at least the twelfth clock cycle.

Figure 7:
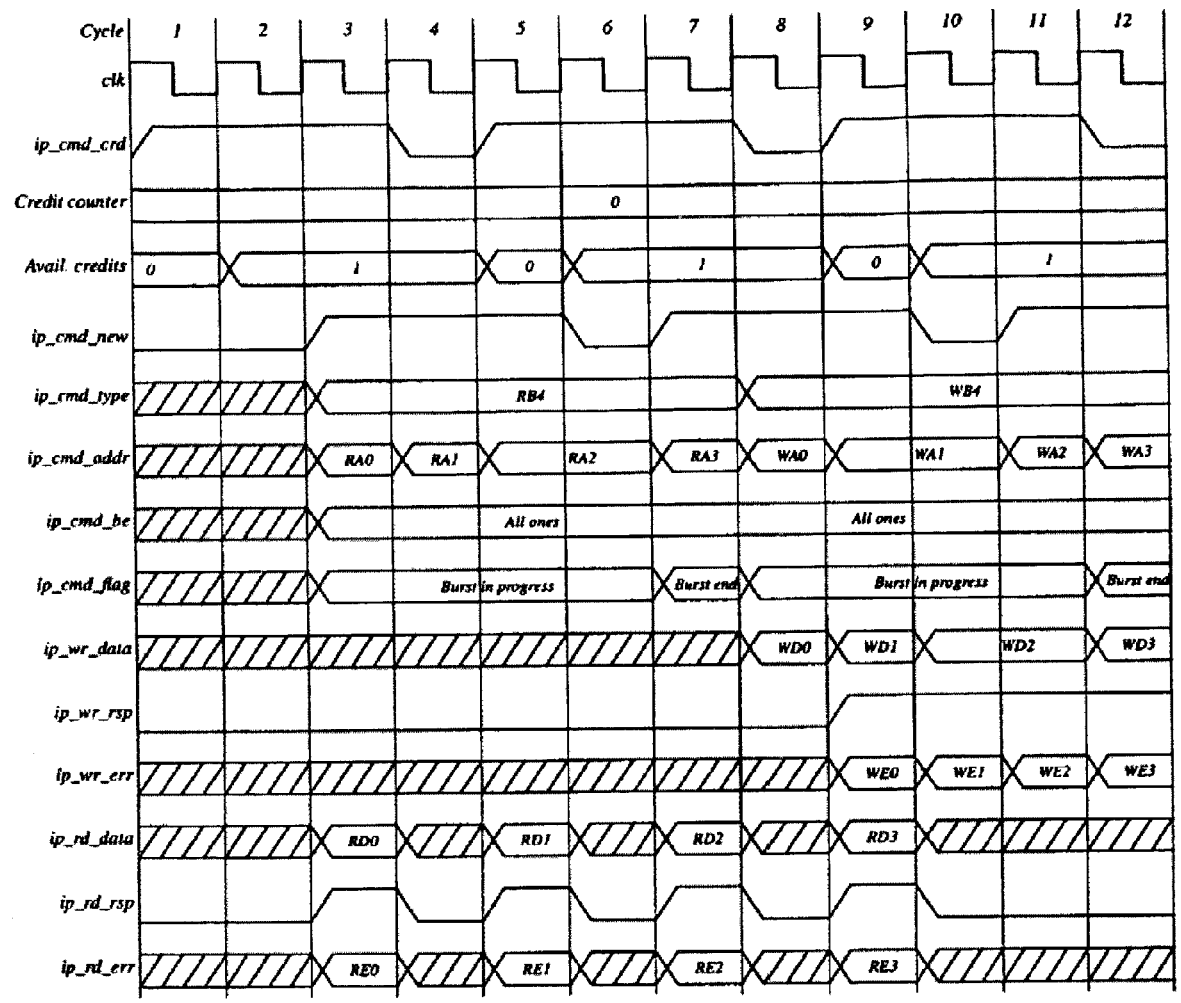
FIG. 7 is a timing diagram of the signals shown in FIG. 4 when issuing burst communication transactions.

FIG. 7 describes the values of the various signals described above with respect to FIGS. 5A and 5B when performing burst transaction issues in a credit-based flow control scheme. During the first clock cycle, the credit register 106 is zero and the target device 104 is asserting the ip_cmd_crd signal to issue a credit to the initiating device 102. No read or write transfer occurs during the first clock cycle.

In the third clock cycle, the first burst read request is issued. The initiating device 102 is able to issue a four instruction burst read request even though only one credit is available. However, successive burst transactions may need to stall when all credits are consumed until the target device 104 issues additional credits. In this example, the first three read requests are issued in cycles three, four, and five; however, no credits are available to allow the initiating device 102 to immediately issue the fourth read transaction. Thus, the third read instruction is sustained until an additional credit is issued by the target device 104 so that the initiating device 102 may issue the fourth read burst transaction.

Figure 8:
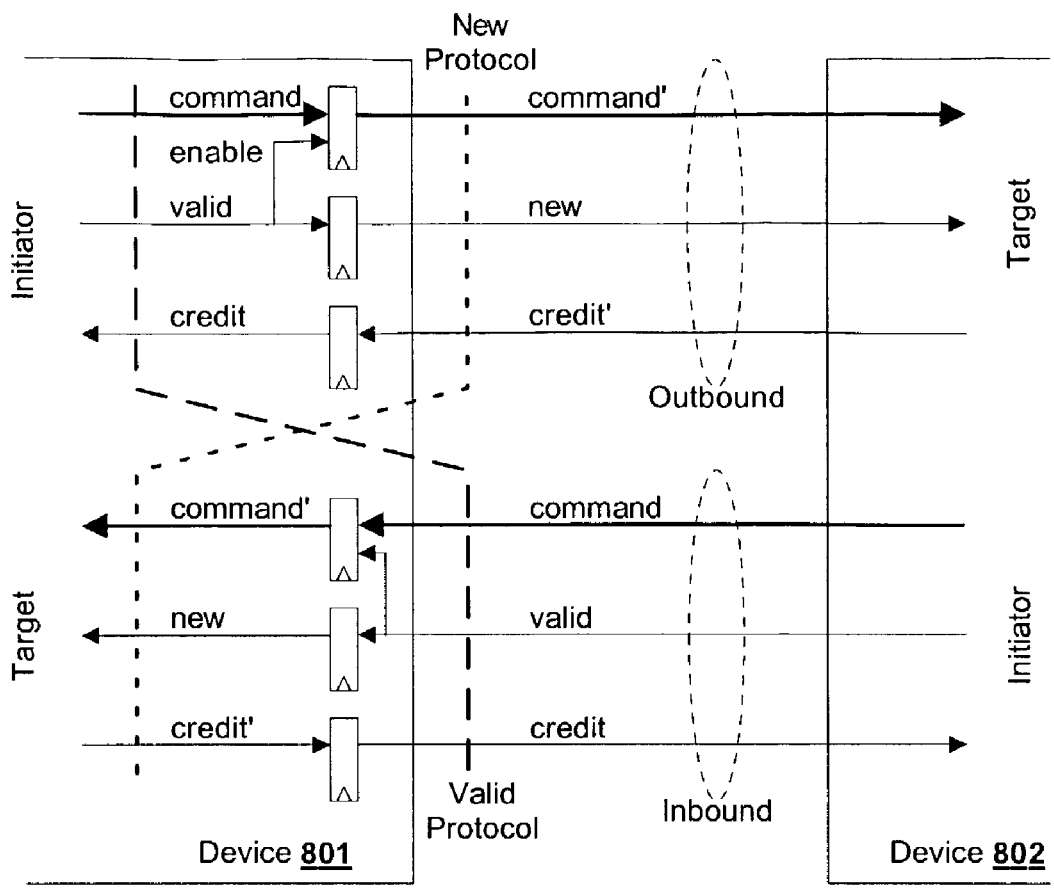
FIG. 8 is a block diagram of devices using a credit-based flow control scheme modified to sustain transaction information until a new command is issued.

Referring to FIG. 8, a credit-based flow control scheme may be modified to sustain bus signals until new commands are issued. In a credit-based flow control scheme that does not sustain bus signals, a valid signal may be asserted to inform the target device 104 that a transaction is available. However, the transaction is only asserted for a single clock cycle. If pipeline registers are placed on command and data inputs and outputs, then a valid signal scheme may be changed to a sustained-bus signal scheme by using the valid signal to enable the registers to be sustained. The sustained registers retain their values despite changes in their inputs until they are again enabled.

As shown in FIG. 8, the inbound (i.e., valid-signal-based) and outbound (i.e., new-signal-based) interfaces of device 801 are fully symmetrical and registered. In accordance with one embodiment, these interfaces may be incorporated into system controller 400 (FIG. 4) by configuring IP Interface Port 410, 412, and/or 414 like device 801 and User IP Module 416, 418, and/or 420 like device 802.

Using an interface with a credit-based flow control scheme with sustained bus signals allows a target device 104 to be implemented completely without buffers. The target device 104 issues a single credit at a time. The initiating device 102 then places a request on its output buffers and the request remains stable for the target device 104 to process. When the target has done whatever it wants to do with the request, it issues a new credit to the initiating device 102 and waits for the next request.

By using output buffers on the initiating device 102, the combinational logic within the initiating device 102 is insulated from the target device 104, which simplifies the interface between the initiating device 102 and the target device 104 and improves the timing characteristics with respect to the target device 104. Because the target device 104 only receives buffered signals, the design of the target device 104 does not need to consider delays caused by the combinational logic of the initiating device 102.

If the control and data signals of the initiating device 102 are buffered, the target can save a full layer of buffering. Reducing the number of registers may result in substantial savings, both in terms of power and area, especially in 64-bit systems.

Figure 9:
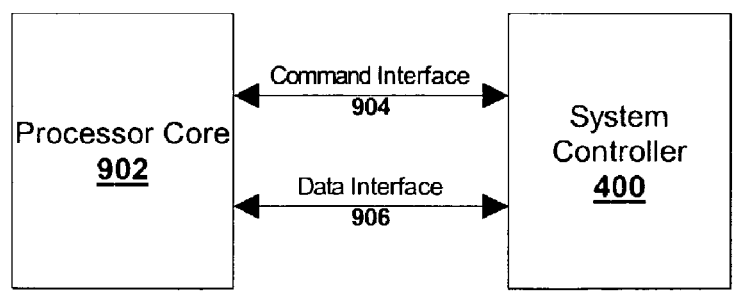
FIG. 9 is a block diagram of an interface between a system controller and a processor core.

Referring to FIG. 9, in one implementation, an interface with credit-based flow control and sustained bus signals is used between a system controller 400 and a processor core 902. When processor core 902 needs to access system resources, the processor core 902 may issue a single processor request or a series of processor requests to a system controller 400. Processor requests may include, for example, reads, rights, cache, and sync requests. In this implementation, the system controller 400 is a target device 104 and the processor core 902 is an initiating device 102.

The processor core 902 and the system controller 400 use a credit-based flow control interface similar to that described above with respect to FIGS. 1-8. This allows the processor core 902 to prevent from issuing requests to the system controller 400 that the system controller 400 cannot handle. In this implementation, an individual credit allows for a single cycle transfer on the bus between the processor core 902 and the system controller 400. Command transfers occur using command interface 904 and data transfers occur using data interface 906. In this implementation, command and data requests are handled separately; a command credit is required to issue a transfer on the command interface 904 and a data credit is required to issue a transfer on the data interface 906. In addition, data responses associated with coherent requests from system controller 400 (e.g., intervention/invalidate requests) also are handled separately from data and command transfers.

To implement the three interfaces, three counters similar to credit register 106 are maintained: SysCmdRscCount keeps track of command credits; SySDataRscCount keeps track of write data credits; and SysRspCount keeps track of data response credits. Three separate signals are used to issue credits: EB_SysCmdCredit is used to issue command credits; EB_SysDataCredit is used to issue write data credits; and EB_SysRspCredit is used to issue data response credits. Each of the counters reflect the available resources in the system controller 400. The system controller 400 as the target device 104 issues credits as resources become available to the processor core 902.

When the processor core 902 issues a request to the system controller 400, it decrements the corresponding credit register 106. Once a counter reaches zero, the processor stops issuing requests corresponding to that counter until the system controller 400 as a target device 104 indicates resources are available.

When issuing a request to system controller 400, processor core 902 briefly asserts a "Command New" signal (i.e., EB_PrcCmdNew) which validates information about the transaction (e.g., type, address, etc.) on command interface 904. This information changes value only when EB_PrcCmdNew is asserted.

Similarly, when sending data to system controller 400, processor core 902 briefly asserts a "Data New" signal (i.e., EB_PrcDataNew) which validates data-related information on data interface 906. This information changes value only when EB_PrcDataNew is asserted.

In addition to interface implementations using hardware (e.g., within a microprocessor or microcontroller), implementations also may be embodied in software disposed, for example, in a computer usable (e.g., readable) medium configured to store the software (i.e., a computer readable program code). The program code causes the enablement of the functions or fabrication, or both, of the systems and techniques disclosed herein. For example, this can be accomplished through the use of general programming languages (e.g., C, C++), hardware description languages (HDL) including Verilog HDL, VHDL, AHDL (Altera HDL) and so on, or other available programming and/or circuit (i.e., schematic) capture tools. The program code can be disposed in any known computer usable medium including semiconductor, magnetic disk, optical disk (e.g., CD-ROM, DVD-ROM) and as a computer data signal embodied in a computer usable (e.g., readable) transmission medium (e.g., carrier wave or any other medium including digital, optical, or analog-based medium). As such, the code can be transmitted over communication networks including the Internet and intranets.

It is understood that the functions accomplished and/or structure provided by the systems and techniques described above can be represented in a core (e.g., a microprocessor core) that is embodied in program code and may be transformed to hardware as part of the production of integrated circuits. Also, the systems and techniques may be embodied as a combination of hardware and software. Accordingly, other implementations are within the scope of the following claims.

What is claimed is:

1. A system for communicating between an initiating device and a target device using credit-based flow control, comprising:
    a data bus;
    a credit register coupled to the data bus and configured to store a credit value;
    a target device coupled to the data bus and configured to increment the credit value when ready to process a command, wherein the target device increments the credit value regardless of whether a buffer is available at the target device to receive the command; and an initiating device coupled to the credit register and having an output buffer,
wherein when the command is available and the credit value is greater than zero, the initiating device is configured to decrement the credit value and store the command in the output buffer if the target device cannot receive the command, and
wherein after the command is stored in the output buffer, if the target device is able to process the command, the command is retrieved from the output buffer by the target device.

2. The system of claim 1 wherein the data bus carries signals including control signals and data signals.

3. The system of claim 2 wherein the control signals include a signal to indicate a new command.

4. The system of claim 1 wherein the initiating device is a system controller.

5. The system of claim 1 wherein the target device includes one or more from the group consisting of a mpeg decoder; an encryption module; a peripheral bus controller; an AHB interface; and a PCI interface.

6. The system of claim 1 wherein the command includes one or more from the group consisting of: a read command; a write command; and a burst command.

7. A non-transitory computer-readable storage medium having encoded thereon computer-readable program code, to generate an electronic system, the electronic system comprising:
a data bus;
a credit register coupled to the data bus and configured to store a credit value;
a target device coupled to the data bus and configured to increment the credit value when ready to process a command, wherein the target device increments the credit value regardless of whether a buffer is available at the target device to receive the command; and
an initiating device coupled to the credit register and having an output buffer,
wherein when the command is available and the credit value is greater than zero, the initiating device is configured to decrement the credit value and store the command in the output buffer if the target device cannot receive the command, and
wherein after the command is stored in the output buffer, if the target device is able to process the command, the command is retrieved from the output buffer by the target device.

8. The non-transitory computer-readable storage medium of claim 7 wherein the data bus carries signals including control signals and data signals.

9. The non-transitory computer-readable storage medium of claim 8 wherein the control signals include a new command signal.

10. The non-transitory computer-readable storage medium of claim 7 wherein the initiating device is a system controller.

11. The non-transitory computer-readable storage medium of claim 7 wherein the target device includes one or more from the group consisting of: a mpeg decoder; an encryption module; a peripheral bus controller; an AHB interface; and a PCI interface.

12. The non-transitory computer-readable storage medium of claim 7 wherein the command includes one or more from the group consisting of: a read command; a write command; and a burst command.

13. An initiating device with an interface to a target device using a credit-based flow control, the initiating device comprising:
a credit register coupled to a communication bus and configured to store a credit value, wherein a target device is coupled to the communication bus and configured to increment the credit value when ready to process a command, wherein the target device increments the credit value regardless of whether a buffer is available at the target device to receive the command;
a coupling, by an initiating device to the communication bus and the credit register; and
an output buffer,
wherein when the command is available and the credit value is greater than zero, the initiating device is configured to decrement the credit value and store the command in the output buffer if the target device cannot receive the command, and
wherein after the command is stored in the output buffer, if the target device is able to process the command, the command is retrieved from the output buffer by the target device.

14. The initiating device of claim 13 wherein the initiating device is a system controller.

15. The initiating device of claim 13 wherein the initiating device is a processor core.

16. The initiating device of claim 13 wherein the communication bus includes control signals and data signals.

17. The initiating device of claim 13 wherein transactions issued by the initiating device include one or more from the group consisting of: a read transaction; a write transaction; and a burst transaction.

18. A target device with an interface to a initiating device using a credit-based flow control, the target device comprising:
a coupling of the target device to an initiating device, a credit register and an output buffer at the initiating device via a communication bus,
wherein the credit register is configured to store a credit value, and wherein the target device is configured to increment the credit value when ready to process a command,
wherein the target device increments the credit value regardless of whether a buffer is available at the target device to receive the command,
wherein when the command is available and the credit value is greater than zero, the initiating device is configured to decrement the credit value and store the command in the output buffer if the target device cannot receive the command, and
wherein after the command is stored in the output buffer, if the target device is able to process the command, the command is retrieved from the output buffer by the target device.

19. The target device of claim 18 wherein the target device includes no buffers to store transactions received from the communication bus.

20. The target device of claim 18 wherein the target device is a system controller.

21. The target device of claim 18 wherein the target device includes one or more from the group consisting of: a mpeg decoder; an encryption module; a peripheral bus controller; an AHB interface; and a PCI interface.

22. A non-transitory computer-readable storage medium having encoded thereon computer-readable program code, to generate an initiating device with an interface to a target device using a credit-based flow control, the initiating device comprising:
- a credit register coupled to a communication bus and configured to store a credit value, wherein a target device is coupled to the communication bus and configured to increment the credit value when ready to process a command, wherein the target device increments the credit value regardless of whether a buffer is available at the target device to receive the command;
- a coupling, by an initiating device to the communication bus and the credit register; and
- an output buffer,
  - wherein when the command is available and the credit value is greater than zero, the initiating device is configured to decrement the credit value and store the command in the output buffer if the target device cannot receive the command, and
  - wherein after the command is stored in the output buffer, if the target device is able to process the command, the command is retrieved from the output buffer by the target device.

23. A symmetrical interface between a first device and a second device using credit-based flow control, the interface comprising:
- a first bus operable to couple said first device to said second device;
- a first credit signal corresponding to the first bus such that the first credit signal is asserted to indicate that a transaction may be issued by the first device to the second device on the first bus, wherein the first credit signal is asserted regardless of whether a buffer is available at the second device to receive the transaction;
- a first command signal corresponding to the first bus such that the first credit signal is asserted by the first device to indicate that a first transaction is being issued on the first bus, wherein the first transaction is stored in a first output buffer at the first device if the second device cannot receive the first transaction, wherein after the first transaction is stored in the first output buffer, if the second device is able to process the first transaction, the first transaction is retrieved from the first output buffer by the second device;
- a second bus operable to couple the first device to the second device;
- a second credit signal corresponding to the second bus such that the second credit signal is asserted to indicate that a second transaction may be issued by the second device to the first device on the second bus, wherein the second credit signal is asserted regardless of whether a buffer is available at the first device to receive the second transaction; and
- a second command signal corresponding to the second bus such that the second credit signal is asserted by the second device to indicate that a second transaction is being issued on the second bus, wherein the second transaction is stored in a second output buffer at the second device if the first device cannot receive the second transaction, wherein after the second transaction is stored in the second output buffer, if the first device is able to process the second transaction, the second transaction is retrieved from the second output buffer by the first device.

24. In an initiating device interfaced with a target device using credit-based flow control, a method for controlling transactions between the initiating and the target device, the method comprising:
- determining that a credit value has been modified by a target device when the target device is ready to process a command, such credit value being modified regardless of whether a buffer is available at the target device to receive the command; and
- when a transaction is available to issue to the target device:
  - determining whether the target device is able to receive the transaction;
  - if the target device cannot receive the transaction, storing the transaction in an output buffer at the initiating device, wherein after the transaction is stored in the output buffer, if the target device is able to process the transaction, allowing the transfer of the transaction to the target device from the output buffer and modifying the credit value.

25. The method of claim 24 wherein the transaction includes a read request to the target device.

26. The method of claim 24 wherein the transaction includes a write request to the target device.

27. The method of claim 24 wherein the target device includes no buffers for storing transactions from the initiating device.

28. The method of claim 24 wherein the transaction is a burst command indicating a number of consecutive commands.

29. The method of claim 24 further comprising registering the transaction at the initiating device.

* * * * *